United States Patent
Simske et al.

(10) Patent No.: US 8,857,727 B2
(45) Date of Patent: Oct. 14, 2014

(54) SYSTEM FOR GENERATING AN INCREMENTALLY COMPLETED 3D SECURITY MARK

(75) Inventors: Steven J. Simske, Fort Collins, CO (US); Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/810,684

(22) PCT Filed: Oct. 12, 2010

(86) PCT No.: PCT/US2010/052408
§ 371 (c)(1),
(2), (4) Date: Jan. 17, 2013

(87) PCT Pub. No.: WO2012/050571
PCT Pub. Date: Apr. 19, 2012

(65) Prior Publication Data
US 2013/0193217 A1    Aug. 1, 2013

(51) Int. Cl.
*G06K 19/06* (2006.01)
*G06F 21/74* (2013.01)
*G06F 21/62* (2013.01)

(52) U.S. Cl.
CPC .. *G06K 19/06037* (2013.01); *G06F 2221/2107* (2013.01); *G06F 2221/2105* (2013.01); *G06F 21/74* (2013.01); *G06F 21/6209* (2013.01)
USPC ...................... 235/494; 235/462.04

(58) Field of Classification Search
USPC ........... 235/462.01, 469, 494, 462.04, 462.09
See application file for complete search history.

(56) References Cited

U.S. PATENT DOCUMENTS

| | | | |
|---|---|---|---|
| 5,369,261 A * | 11/1994 | Shamir | 235/469 |
| 5,576,528 A | 11/1996 | Chew et al. | |
| 5,869,828 A | 2/1999 | Braginsky | |
| 6,398,117 B1 | 6/2002 | Oakeson et al. | |
| 7,185,816 B1 | 3/2007 | Shoobridge | |
| 7,225,991 B2 | 6/2007 | Jones et al. | |
| 7,533,817 B2 | 5/2009 | Ming et al. | |
| 7,583,848 B2 * | 9/2009 | Kakii | 382/240 |
| 2005/0269416 A1 * | 12/2005 | Sussmeier et al. | 235/494 |

(Continued)

FOREIGN PATENT DOCUMENTS

| | | |
|---|---|---|
| EP | 1959374 | 8/2008 |
| EP | 2161313 | 3/2010 |
| WO | WO01/24106 | 4/2001 |
| WO | WO-0124106 A1 | 4/2001 |

*Primary Examiner* — Tuyen K Vo

(57) ABSTRACT

A system (10) for generating an incrementally completed 3D security mark (20''') includes a computer-readable medium encoded with a computer program. The computer program has computer readable code for selecting a color transformation process at each stage in a workflow associated with the 3D security mark (20'''); computer readable code for selecting a scrambling technique for data to be placed into a carrier object (20, 20', 20", 20''') of the 3D security mark (20''') at each stage in the workflow; computer readable code for selecting a manner in which a state change of the carrier object (20, 20', 20", 20''') at each stage in the workflow results in a predictable change in the 3D security mark (20'''); and computer readable code for weighting writing schemes at each stage in the workflow. The system (10) further includes further includes memory and a processor operatively coupled to the memory and to the computer-readable medium.

16 Claims, 3 Drawing Sheets

(56) References Cited

U.S. PATENT DOCUMENTS

2007/0125861 A1 6/2007 Shoobridge
2007/0278303 A1* 12/2007 Cattrone .................... 235/462.1
2007/0278313 A1 12/2007 Jones et al.
2008/0000991 A1* 1/2008 Yin et al. ..................... 235/494
2008/0304110 A1 12/2008 Simske et al.
2009/0141892 A1* 6/2009 Simske et al. ................. 380/55
2009/0166418 A1* 7/2009 Onoda et al. .................. 235/435
2010/0038439 A1 2/2010 Kuyper-Hammond et al.

* cited by examiner

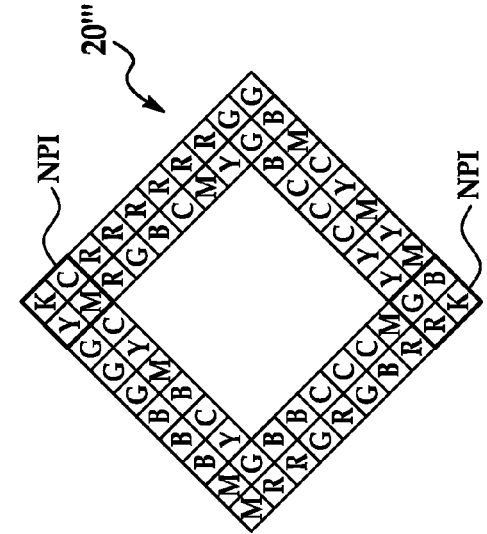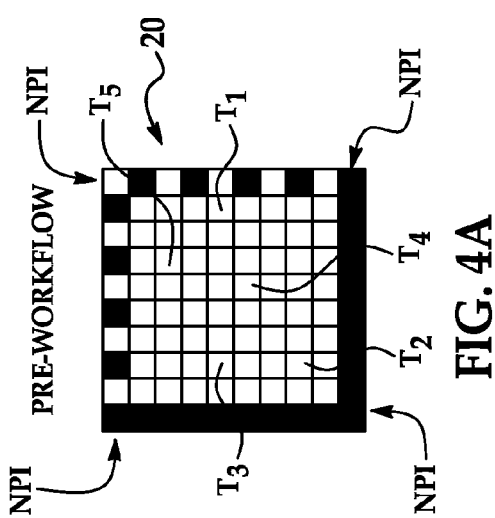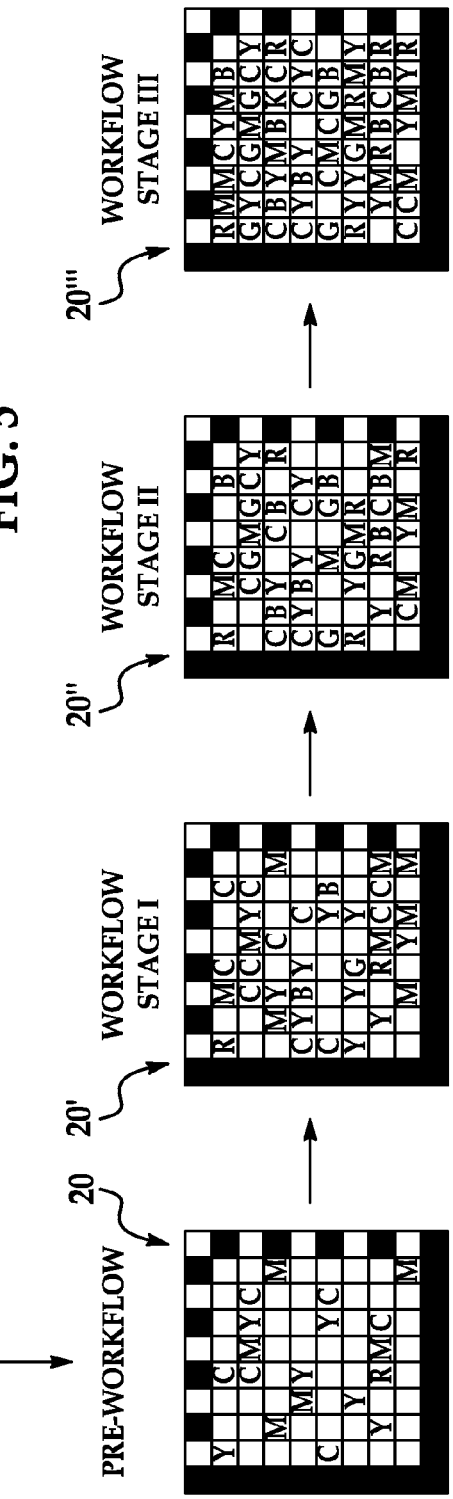

SYSTEM FOR GENERATING AN INCREMENTALLY COMPLETED 3D SECURITY MARK

BACKGROUND

The present disclosure relates generally to a system for generating an incrementally completed 3D security mark.

Documents exist in both physical (e.g., printed) and electronic forms. During its lifecycle (i.e., the document in all its forms from creation to completion), one document may move between physical (e.g., paper) and electronic (e.g., computer file) forms several times and may also progress through several stages of a workflow (i.e., a defined set of stages, usually with task(s) at each stage, which a document must pass through during its lifecycle, to perform some useful purpose). Security features laden with information (e.g., bar codes) may be associated with the document, and may be used to move the document from one stage to the next in its workflow. As one example, sequential security features (e.g., sequential barcodes) may be added to the document at each stage in the workflow. This approach may be useful because each stage of the workflow can be associated with one of the sequential barcodes, and thus the status of the workflow can be monitored via the barcodes that have been added. As another example, a single static security feature (e.g., one barcode) may be used throughout the workflow to identify the item. This approach is sensitive to the use of "real estate" (layout area) on the physical form of the document, but does not enable one to monitor the status of the workflow via the security feature.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4E depict an embodiment of a carrier object as it progresses through a workflow and has information incrementally written thereto using color to generate an embodiment of an identifying object (i.e., 3D security mark); and FIG. 5 depicts another embodiment of an identifying object (i.e., 3D security mark).

DETAILED DESCRIPTION

Embodiments of the system disclosed herein are used to generate a color identifying object (e.g., a feature or mark laden with information). The color information-carrying identifying object does not grow in size and/or shape as the item moves through a workflow associated therewith, even though information may be added at each stage of the workflow. The color identifying object may be designed taking into account security needs, the type of readers available, and other concerns (e.g., branding, fraud prevention, robustness to damage, etc.).

As previously mentioned, a workflow is a defined set of stages, usually with task(s) at each stage, which a document must pass through during its lifecycle. In one embodiment, the workflow is an automated process during which documents, information, and/or tasks are passed from one participant to another for action or informative purposes, according to a set of procedural rules. Workflows include imaging workflows (e.g., quality assurance, authentication, forensics, etc), supply chain workflows (e.g., track and trace, inspection, shipping/receiving, recall, etc.), environmental or sensor data monitoring workflows, or other suitable workflows (e.g., statistics (e.g., inventory, average time at a node, etc.), compliance, auditing, etc.). In other words, a workflow is any defined set of tasks to complete associated with a document. Also as used herein, a "node" refers to a then-current stage in the workflow. In one embodiment, if a document moves from a creator to an editor to a subscriber, the respective nodes are, for example, creation, editing, and receiving. At any instance, the node corresponds with a current version (whether physical or electronic) of a document (e.g., a composite document, or a document including several items (e.g., PDFs, PPTs, DOCs, etc.)). It is to be understood that nodes can also be in parallel, for example, when multiple recipients need to acknowledge receipt.

The document and its associated identifying object may be physical (e.g., print over the same sheet at each stage in the workflow), electronic (e.g., information added electronically and displayed on an electronic display), and/or mixed physical and electronic (e.g., printed and scanned, information added electronically, and then re-printed).

Figure 1:
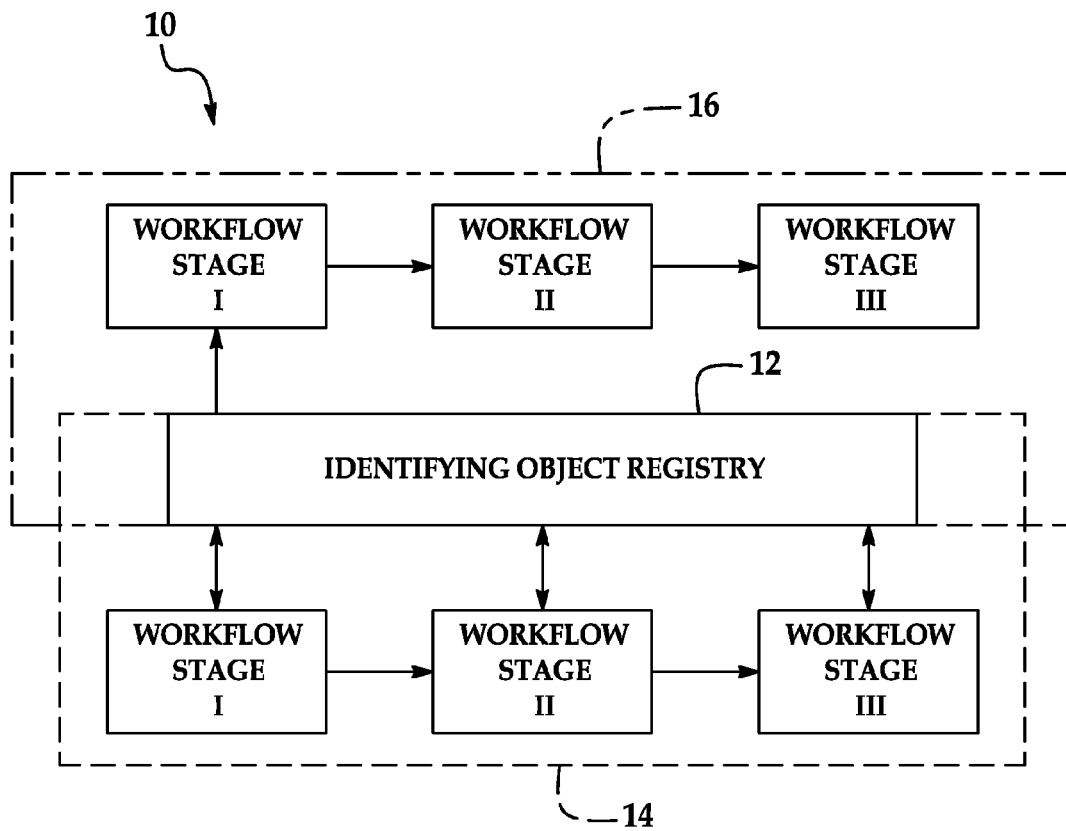
FIG. 1 is a schematic diagram of two embodiments of a system for generating an incrementally completed 3D security mark.

Referring now to FIG. 1, an embodiment of the system 10 for generating embodiments of the color identifying object (i.e., 3D barcode) is depicted. As shown in FIG. 1, the system 10 may be set up to perform a registry-based workflow 14 or an independent incremental workflow 16. Each of these workflows 14, 16 involves a different path by which the document and identifying object are received at the various stages. When a registry-based workflow 14 is utilized, at each stage in the workflow, a user receives the document and its associated carrier object (discussed further hereinbelow) from the previous user, but the user can refer back to the registry 12 for information about the document and its associated identifying object. The addition to the carrier object at each stage in the workflow will be performed in conjunction with the registry 12. When an independent incremental workflow 16 is utilized, there is no backward visibility in the workflow stage-stage transmission, and the user receives the document and an intelligent hash of the previous state of the carrier object from the previous user. In this embodiment, the users at the various workflow stages may/do not have access to the registry 12 (i.e., the carrier object is updated independently of the registry 12), and the addition to the carrier object at each stage in the workflow will be performed in conjunction with initial instructions received from the registry 12. This embodiment may be desirable, for example, when the distribution network organization is proprietary.

Each stage of the workflow can be deduced when the starting point is known, as most workflows have a small and well-defined set of nodes. Workflow exceptions may occur, however, when extra steps have been added and the workflow has gone on too long (e.g., a non-legitimate progression)

and/or when available space for writing becomes sparse during the workflow. In such instances, each stage of the workflow may not be deduced.

The system 10 includes the identifying object registry 12 that includes hardware (e.g., memory, processor, etc.) and/or software (computer program(s) with computer readable code) for generating an incrementally completed 3D barcode or 3D security mark. Access to the registry 12 may be secure (e.g., requiring a login and password or other authorization method, such as biometric validation of identity, possession of a secure token, etc.) or unsecure (e.g., publicly accessible).

In one embodiment (e.g., when the registry-based workflow 14 is used), the system 10 may be set up as a cloud computing network, which may be a virtualized bank of computers (e.g., processors and/or servers) that enables Internet-based computing. Via the cloud network, shared resources, software and information are provided to various computing devices (i.e., those operating at the various workflow stages, whether stationary (e.g., desktop computers) or mobile (e.g., laptop computers, netbooks, cellular phones, personal digital assistants (PDAs), etc.)) on-demand. The cloud computing network allows the registry system provider (not shown) to deliver the identifying object registry 12 and its various services to subscribers (or non-subscribers if access is unsecure) online via another web service or software, such as a web browser. Software and data associated with the cloud computing network are stored on servers and their associated memory (not shown).

In another embodiment (e.g., when the independent incremental workflow 16 is used), the system 10 may be set up as a network for use with a proprietary system where a bank of computers (e.g., processors and/or servers) i) has no backward visibility in the workflow and ii) enables computing based upon that which is received from a previous node in the workflow. Each computer has its own software and data stored on servers and their associated memory (not shown).

Figure 2:
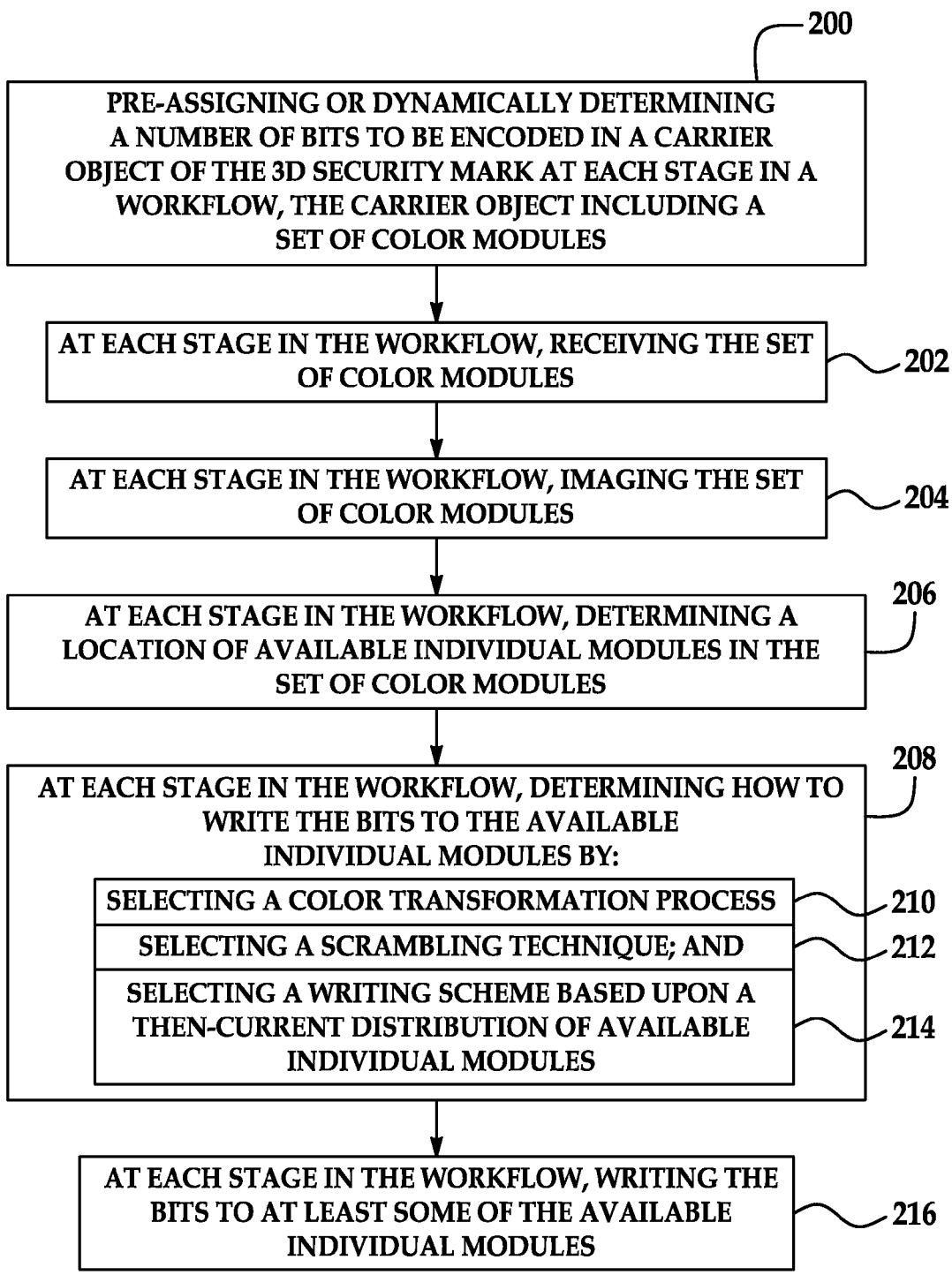
FIG. 2 is a flow diagram of an embodiment of a method for generating an embodiment of the incrementally completed 3D security mark.

One embodiment of the method for generating the identifying object using the system 10 is shown in FIG. 2. It is to be understood that the various steps of the method are further discussed hereinbelow.

Prior to configuring the system 10 and its various components to generate a color identifying object, the stages of the workflow can be set and a number of payload elements to write in total or during each state of the workflow can also be set. In some instances however, the number of payload elements may be dynamically determined at any stage in the workflow (e.g., if additional bits need to be added for security at a stage of the workflow that takes place outside of a secure environment). In one embodiment, a carrier object may be selected first, and then the workflow and number of payload elements may be designed around the selected carrier object. In another embodiment, the workflow and the number of payload elements may be selected, and then the carrier object may be selected to fit the specifications of both the workflow and the total number of bits to be carried (i.e., the carrier object contains all needed modules for every step in the workflow upon creation of the identifying object). A carrier object is the feature or mark that will be incrementally written to using color pathways throughout the workflow to form the identifying object (e.g., 3D barcode or security mark). The carrier object includes a field of modules (e.g., glyphs, areas, marks, dots, graphics, symbols, etc.) that has four possible states, where each state is readily disambiguated from each other state. Non-limiting examples of suitable carrier objects for a 3D security mark includes a set of color tiles, layered tiles, color lines, guilloches, etc. Color tiles may include square shaped tiles, rectangular shaped tiles, triangle shaped tiles, other shaped tiles (e.g., circular, oval, etc.), mixed shaped tiles, mixed sized tiles, non-uniformly shaped tiles, or combinations thereof. Each state of the carrier object is determined by the set of modules that have been written to at a given stage of the workflow.

Figure 3:
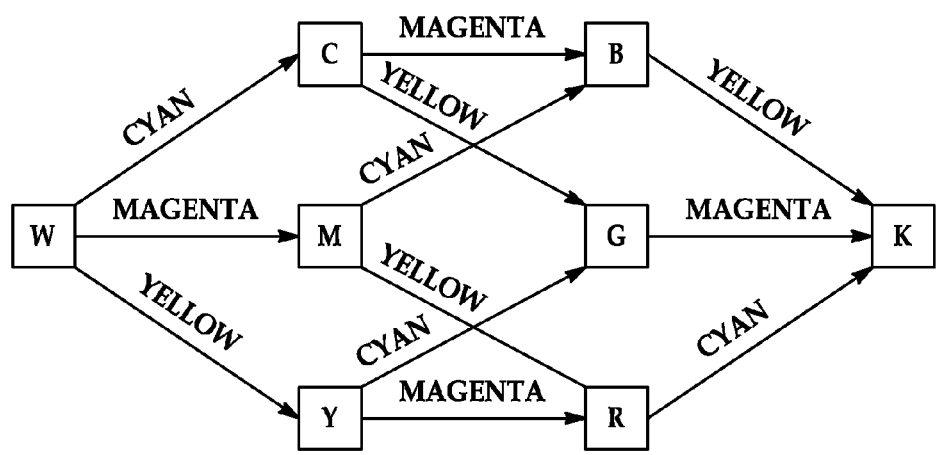
FIG. 3 is a schematic diagram illustrating color pathways that may be used in the lifecycle of a color tile in a 3D security mark.

Referring briefly to FIG. 3, each of the modules in a 3D barcode has 4 different states. Each module (e.g., glyphs, tiles, etc.) may be written to three times in its lifecycle (i.e., may contain up to 3 bits), and may be one of 8 possible colors. FIG. 3 illustrates the allowable color pathways or states from a white tile W to a black tile K, where the subtractive primary colors (cyan C, magenta M, and yellow Y) are used. The color pathways set forth in FIG. 3 are one possible means of writing to an incremental security mark, and are especially suitable when the mark is a physical mark. When the mark is at least partially electronic, other means of writing may be used, for example, which progress through hue, saturation and/or intensity. Such other progressions may use as many or as few colors as is desired. When the mark is used in a fully electronic workflow, or a mixed print/electronic workflow—in which direct overprinting of the carrier object is not required—it is to be understood that the color pathways shown in FIG. 3 may or may not be used. Any color pathway could be used (e.g., white to yellow, magenta to cyan, white to yellow to magenta to green, etc.) because the carrier object's progressive color representation exists in electronic form and is essentially recreated at each stage in the workflow. While this is not an example of an overprinting progression of the security mark, it is still a progression of the security mark because the state of the carrier object changes at each stage in the workflow. In such a case, a different color progression than the embodiment shown in FIG. 3 would be allowable, and in some instances, more desirable.

In the embodiment of FIG. 3, the first state is white in color, and indicates that no information has been written to the module (e.g., glyph, tile, etc.). A white module W can be overprinted with cyan, magenta, or yellow to create, respectively, a cyan colored module C, a magenta colored module M, or a yellow colored module Y. Any of these colored modules C, M, Y, contains 1 bit of information and indicates a second state of glyph/tile. The cyan colored module C can be overprinted with magenta or yellow to create, respectively, a blue colored module B or a green colored module G. The magenta colored module M can be overprinted with cyan or yellow to create, respectively, a blue colored module B or a red colored module R. The yellow colored module Y can be overprinted with cyan or magenta to create, respectively, a green colored module G or a red colored module R. Any of the blue, green or red colored modules B, G, R contains 2 bits of information and indicates a third state of the module. The fourth state of any of the modules is black in color and indicates that the module contains 3 bits of information. The blue colored module B can be overprinted with yellow to create the black colored module K, the green colored module G can be overprinted with magenta to create the black colored module K, and the red colored module R can be overprinted with cyan to create the black colored module K. As shown in the embodiment of FIG. 3, a lifecycle can include any one of the following color pathways: WCBK, WCGK, WMBK, WMRK, WYGK and WYRK. As will be discussed further in reference to FIGS. 4A through 4E, the computers/workstations at each stage in the workflow may allow a single write (i.e., encoding with a single color) to occur in one or more modules at a single workflow stage, or may allow multiple writes (i.e., encoding with multiple colors) to occur in one or more modules at a single workflow stage.

In one embodiment, the carrier object, the workflow, and the number of payload elements are set at the identifying object registry 12. The identifying object registry 12 includes a computer-readable medium with a computer program including computer readable code for selecting the carrier object, selecting a number of steps/stages in the workflow, selecting a security level for each step/stage in the workflow, and pre-selecting (i.e., before the workflow is initiated) or dynamically determining (i.e., as the workflow is in progress) a number of payload elements (e.g., bits) to be input at each step/stage in the workflow (see reference numeral 200 of FIG. 2). The workflow and preset number of payload elements may be set or defined using information received at the registry 12 from one or more participants in the workflow. For example, a product manufacturer may request that a workflow be set up for a particular product, and may provide the following information: the distributor, the retailer, and product identification information (e.g., serial number). The identifying object registry 12 may then select a suitable carrier object, generate a suitable workflow, and preset payload information based upon this information. The carrier object and the preset number of payload elements may also be set by the workflow, and thus can be accessed (or looked up) using a number of methods.

In the example provided above, the workflow may involve three stages, the manufacturer, the distributor, and the retailer. At each stage, the workflow may require an individual at the manufacturer and distributor to sign a document associated with the product prior to shipping the product and document to the next entity, and may require an individual at the retailer to sign the document upon receiving the product and document.

The number of payload elements to write to the carrier object at each stage of the workflow is proportional to the desired minimum level of (statistically based) security at any given stage. High-level security stages may write more bits of information to the carrier object, while low-level security stages may write less bits of information to the carrier object. Both probability (i.e., what level of confidence is needed so that the next state of the carrier object cannot be guessed with p probability) and/or Hamming distance (i.e., the sum of bits, defined in the elements of the carrier object, that are different from one stage to the next) may be used to identify the number of bits to encode at each stage of the given workflow.

In 3D barcodes, the number of bits per module is $\ln(C)/\ln(2)$ where $C$ is the number of colors total. Since {WKC-MYRGB} is a set of 8 colors, then 3 bits/module can be represented. This triples the relative density of this particular color barcode in comparison to a binary barcode. In this particular example with 8 colors, there are 3 bits of information that can be overwritten in each module. If 16 colors are used in the color progressive security mark, there are 4 bits/module, or $\ln(16)/\ln(2)=4$. As such, there are $\ln(C)/\ln(2)$ bits to write to each module.

The non-binary identifying objects can be unzipped to be a binary string. For example, a non-binary identifying object which includes modules that can be one of eight states can be unzipped initially to a bit string length that is three times that of a binary identifying object since $8=2^3$ and $2=2^1$. The set of modules can be represented as a number of bits based on the number of possible states. For example, if 10 colors are used in the security mark, then 4 modules represent $10*10*10*10=10000$ states. The nearest power of 2 just below 10000 is 8192, and $2^{13}$, so these 13 modules together unzipped can provide 13 bits of information.

As mentioned above, the Hamming distance is the sum of bits that are different from one stage to the next. In one embodiment, the Hamming distance between successive stages is fixed. Since multiple-color transitions in a single module at a given stage may be allowed, in these embodiments, the possible state-state transitions in a carrier object 20 of a given size is increased. These embodiments still afford a known Hamming distance between workflow stages because the Hamming distance used herein is defined in a non-binary, modified fashion. The following table illustrates the Hamming distance for each color progression in FIG. 3.

TABLE 1

| Hamming Distance for Individual Color Progressions | |
|---|---|
| Color Progression | Hamming Distance |
| W→C | 1 |
| W→M | 1 |
| W→Y | 1 |
| C→B | 1 |
| C→G | 1 |
| M→B | 1 |
| M→R | 1 |
| Y→G | 1 |
| Y→R | 1 |
| B→K | 1 |
| G→K | 1 |
| R→K | 1 |
| W→B | 2 |
| W→G | 2 |
| W→R | 2 |
| C→K | 2 |
| M→K | 2 |
| Y→K | 2 |
| W→K | 3 |

Any suitable modified Hamming distance between the workflow stages may be selected in order to accommodate the desired number of bits to be encoded per stage.

When the number of stages in the workflow has been set and the probability of guessing the state-state transitions required for each stage has been calculated or is otherwise known, the size of the carrier object can be determined and the number of bits to write incrementally can also be determined.

In embodiments when the carrier object is selected after the e total number of bits is identified, the identifying object registry 12 may consider, when selecting the carrier object, the total number of bits to be written to the carrier object, whether it is desirable to include entropy in the identifying object, whether it is desirable to include non-payload indicia in the identifying object, and whether it is desirable to utilize multi-modalities to encode information.

The probability of guessing the initial state with less than a specified statistical probability may be added prior to the initiation of the workflow by partially filling available modules of the carrier object. It is to be understood that a partially completed state of the carrier object has greater security (statistically) than an all-white state of the carrier object. In the embodiments disclosed herein, the "entropy" is such that the number of non-white modules is p, where $0<p<1$, the number of twice-altered modules is roughly $p^2$, etc.

The introduction of non-payload indicia also affects the size of the carrier object because non-payload indicia are included in modules of the carrier object that may have otherwise been written to with payload elements/information. Non-payload indicia do not contain payload elements/information, but rather are used for calibration (e.g., color, skew, and orientation calibration) of the carrier object, for example, at each stage in the workflow. Non-payload indicia may also be used for branding, symbology identification, or the like. When it is desirable to include non-payload indicia, the number of modules to be used for the non-payload indicia may be accounted for in the total number of modules that are desirable for the carrier object.

When selecting the carrier object, it may also be desirable to identify whether multi-modalities will be used to encode information. In these instances, additional information is physically overlaid on modules before or after the modules have progressed to the full black (or other final color) state. The addition of such information may be accomplished using, for example, magnetic ink character recognition (MICR) ink, ultraviolet (UV) ink, infrared (IR) ink, conductive ink, capacitive ink, other taggants that can be read with a specialized reader (e.g., DNA), or finishes that can be read over the final black or other colored ink (e.g., lacquers that can be read by impedance, reflectance, etc.). If the use of multi-modalities is known when selecting the carrier object, the selection can account for the fact that a single module in the carrier object may contain more information than the standard carrier object. The use of multi-modalities may be desirable, for example, when specialized readers are to be used for decoding (e.g., MICR readers, RFID readers, etc.), when there is paucity of real estate for the identifying object, when security check-offs are desirable (e.g., use of UV ink requires a counterfeiter to purchase the product bearing the identifying object which creates a trail), when enhanced forensic capacity is desired (e.g., using IR inks), and/or when additional functionality is desired (e.g., conductive or capacitive information encoding).

When a multi-modality approach is used, each of the additional layers has the following characteristics: (1) glyph (i.e., module) x-dimension, $dim_x$, (2) glyph (i.e., module) y-dimension, $dim_y$, and (3) glyph (i.e., module) intensity levels and associated number of bit levels, $n_b$. The number of additional bits/glyph is $ln(n_b)/ln(2)$.

As an example of using multi-modalities, an MICR ink layer is superimposed the 3D barcode (e.g., which has dimensions $nglyphs_x$ by $nglyphs_y$, where the glyphs are sized $size_x$ by $size_y$). When the MICR ink (e.g., VersaInk black MICR ink manufactured by G7 Productivity Systems) is black, it may be used over black pixels, and thus is added after all of the color transformations have been made. Since in any given glyph there is either MICR or not, there are $ln(2)/ln(2)=1$ bits/glyph. If the MICR bits are $dim_x$ by $dim_y$ in size, then the number of MICR glyphs in the x-direction is $(floor)((nglyphs_x*size_x)/dim_x)$, where floor is the integer value (not rounded, as partial glyphs are not used) of the floating point value $(nglyphs_x*size_x)/dim_x$. The number of tiles in the y-direction is $(floor)((nglyphs_y*size_y)/dim_y)$. Thus, the overall number of bits added by the MICR, $N_b(MICR)$, is:

$$N_b(MICR)=(floor)((nglyphs_x*size_x)/dim_x)*(floor)((nglyphs_y*size_y)/dim_y)$$

In general, if more than one modality (MICR, UV, conductive, etc.) of layers are added to the barcode, the total number of bits are given by:

$$N_b(total) = \sum_{x \in modalities} (floor)((nglyphs_x * size_x)/dim_x) * (floor)((nglyphs_y * size_y)/dim_y) * \frac{ln(n_b(x))}{ln(2)}$$

Multi-modalities may be used in any embodiment disclosed herein, and may be desirable when a carrier object is determined (as a workflow is in progress) to contain insufficient space for the preset number of bits.

Once the workflow is generated (including the various stages and the number of bits to be encoded in total and/or at each stage) and the carrier object is selected, the workflow is initiated. The workflow instructions (e.g., the procedural rules for the transmission of the document(s), actions or purposes associated with the document(s), and either the total number of bits to encode or the number of bits to encode in the document's carrier object at each stage in the workflow) is transmitted electronically to at least the first computer/workstation (e.g., the computers/workstations located at the manufacturer) to be used at the first stage in the workflow. In one embodiment, the computers/workstations used during subsequent stages in the workflow may receive the instructions from the first computer/workstation or from a computer/workstation used in the previous workflow stage. In another embodiment, the computers/workstations used during subsequent stages in the workflow may retrieve the instructions from the registry 12 via the cloud computing network. In another embodiment, the workflow may be initiated without transmitting the workflow instructions. For example, the document and its associated carrier object may be transmitted to the first entity in the workflow. It is to be understood that as long as the starting point of the workflow is known, one can deduce each stage of the workflow.

Throughout the following discussion, reference is made to FIG. 2 and FIGS. 4A through 4E. FIGS. 4A through 4E illustrate a 3D carrier object 20 including modules, which in this example are tiles $T_1$, $T_2$, $T_3$, $T_4$, $T_5$ (all of which are not labeled with the reference character "T"), that can have information incrementally written thereto throughout the workflow. At the end of the workflow, the identifying object 20''' is generated. FIG. 4A illustrates modules (i.e., the tiles along the perimeter of carrier 20) that have been filled in with non-payload indicia NPI. In this example, the non-payload indicia NPI have been implemented as solid tiles (along the left and bottom sides of the carrier 20) and as alternating white/black tiles (along the top and right sides of the carrier 20), which provide calibration during subsequent processing. In FIG. 4A, the remaining white tiles (i.e., including tiles $T_1$, $T_2$, $T_3$, $T_4$, $T_5$ and not including non-payload indicia tiles NPI) are available candidate areas, which can have information written thereto throughout the workflow.

Throughout FIGS. 4A through 4E and in FIG. 5, modules with no color or letter are white tiles, modules bearing a Y are yellow colored tiles, modules bearing a C are cyan colored tiles, modules bearing an M are magenta colored tiles, modules bearing a B are blue colored tiles, modules bearing a G are green colored tiles, modules bearing an R are red colored tiles, and modules that are filled in black or bear a K are black colored tiles.

FIG. 4B illustrates 20 of the 64 available modules/candidate areas (which can encode 192 bits) being pre-filled with 1 or 2 bits of data in order to add entropy to the carrier object 20. As illustrated, 6 tiles are filled with yellow, 6 tiles are filled with cyan, and 6 tiles are filled with magenta. Each of these colored tiles C, M, Y includes 1 bits of information (totaling 18 bits). The carrier object 20 also includes 1 tile filled with red. This red colored tile has been written to twice using one of the following color pathways: WMR or WYR, and thus has two bits of data written thereto.

The carrier object 20, and the document it is associated with, may be physically transmitted or electronically transmitted, and then received at the entity that is associated with the first stage in the workflow (see reference numeral 202 of FIG. 2). When physically transmitted and received, the document and carrier object 20 have been printed and shipped to the entity. When electronically transmitted and received, the document and carrier object 20 have been electronically sent (via email or some other electronic based messaging service) to a computer/workstation at the entity. Regardless of how the document and its associated carrier object 20 are transmitted and received at the entity, a user at the entity obtains an electronic form of the document and its associated carrier object 20. When electronically received, the user need not perform any additional task in order to obtain the electronic form, and when physically received, the user scans or captures with an imager (e.g., a camera) the current image of at least the carrier object 20 to obtain the electronic form.

When the action, task, etc. set forth in the workflow stage I instructions have been performed (e.g., a task is performed and a digital signature verifying task completion is obtained), the carrier object 20 is incrementally written to according to the workflow stage I instructions. This is shown in FIG. 4C.

When incrementally writing to the carrier object 20, the electronic form of the carrier object 20 is first segmented (i.e., imaged, as shown at reference numeral 204 of FIG. 2). Segmentation involves extracting the carrier object 20 from the overall electronic image and determining the content of the carrier object 20. In one embodiment, this is a two-stage process. First, the carrier object 20 is identified in the image and segmented from the entire image. Second, the carrier object 20 itself is interpreted (i.e., decoded).

Segmentation may also involve calibrating the carrier object 20. Calibration may involve orienting the carrier object 20 using the non-payload indicia 20, dewarping the carrier object 20, deskewing the carrier object 20, identifying a set of allowable hues, or the like. It is to be understood that calibration may be performed in conjunction with interpretation of the carrier object 20, or calibration may be performed and then interpretation of the carrier object 20 may be performed.

The carrier object 20 is interpreted/decoded by analyzing the pixels in each of the modules of the object 20. When more than 50% of the pixels in a module are colored, the glyph will be identified as a particular colored module (cyan glyph C, black glyph K, etc.). When more than 50% of the pixels in a module are white, the module will be identified as a white or non-written to (available) module. The interpretation/decoding of the carrier object 20 in FIG. 4B (as received by those performing workflow stage I) will reveal that there are non-payload indicia along the perimeter and that 20 of the 64 available candidate areas have been written to. The computer/workstation performing the incremental writing at workflow stage I then determines the location of remaining available candidate areas that can be written to (e.g., tiles not already filled with non-payload indicia, non-black tiles, etc.), as shown at reference numeral 206 in FIG. 2. It is to be understood that a variety of algorithms may be used to determine where to place the information associated with workflow stage I (which may include the preset number of bits). Non-limiting examples of these algorithms include scrambling, random/nonce, one-time-pad, encryption, data replication, etc. These techniques identify where the information can be added to the carrier object 20.

In one embodiment after the available candidate areas in the carrier object 20 are identified, the computer/workstation performing the incremental writing at workflow stage I then identifies or retrieves the preset number of bits (e.g., from the workflow instructions) to be written at the then-current stage. In other embodiments, the number of bits to be written at a particular stage may be determined automatically by the computer/workstation performing the incremental writing at workflow stage I and/or by a user at workflow stage I. In the latter embodiments, the total number of bits to be encoded throughout the workflow is known, and the computers/workstations at each workflow stage would add a suitable amount of information to the carrier object 20. For example, a string containing 0's and then 1's incrementally to be written could be stored as a nonce and then the 1's would be incrementally written to the carrier object 20 stage by stage.

The computer/workstation performing the incremental writing at workflow stage then determines how to write the information (i.e., the preset or dynamically determined number of bits), as shown at reference numeral 208 of FIG. 2. The computer/workstation includes a computer-readable medium with a computer program having computer readable code for selecting a color transformation process for writing the data (see reference numeral 210 in FIG. 2), computer readable code for selecting a scrambling technique for writing the data (see reference numeral 212 in FIG. 2), computer readable code for selecting a manner in which a state change at this workflow stage will result in a predictable change in the carrier object 20, and computer readable code for weighting writing schemes at this stage in the workflow (see reference numeral 214 in FIG. 2).

When determining how to write the information, the computer/workstation will use the information from segmentation to identify the then-current colors of the available candidate areas in the carrier object 20. As an example, all 64 of the candidate areas in the carrier object 20 of FIG. 4B are available for having some information written thereto. In particular, the yellow, cyan and magenta tiles Y, C, M are able to have 2 more bits written thereto; the white tiles (non-payload indicia unmarked tiles) are able to have 3 bits written thereto; and the red tile R is able to have 1 more bit written thereto. Algorithms programmed in the computer/workstation are able to identify the color pathways that are available for each of the available candidate areas. The color pathway that is ultimately selected is based upon the then-current colors of the particular tiles and the number of bits to be written to at the particular stage in the workflow (see again reference numeral 210 in FIG. 2). Any color pathway may be selected so long as the given number of bits is written so that the carrier object 20 reaches the next state according to the specified Hamming distance.

When determining how to write the information, the computer/workstation will select the scrambling technique by identifying an algorithm to be used for incorporating the information for the current workflow stage (see again reference numeral 212 in FIG. 2). This algorithm may be random or nonce based, or may be deterministic. In instances where the registry-based workflow 14 is used, the previous state of the carrier object 20 may be replicated using the cloud network, so that random/nonce methods are valid when inputting new information. For example, the information to be added is provided by a random number generator and is stored in the registry 12. In this example, the newly added bits are randomly added, and the registry 12 (or cloud) can provide and store the random new bits. For example, if a 3D barcode has 15×15 tiles that can be written to, 60 tiles are pre-populated with NPI and/or non-white colors (collectively adding entropy to the tile color histogram), and 20 bits are to be added at the current stage in the workflow, the random/nonce algorithm may write to 20 of the previously unwritten to 165 available areas. One embodiment for accomplishing this is as follows:

```
double random = Rand.NextRandom( );
Location = START; // first open space is position to write, if indicated
while( nwritten < 20 )
```

```
{
for( i=0; i<ntiles; i++)
    If(( random-residual < (20/165) ) && (allowed to write here))
    {
        Location.write( 1 ); // progress one step toward black (K)
        nwritten++;
    }
    else
        Location.write( 0 ); //leave alone
    Location++; // position at next open space regardless
    // update residual here to ensure that one pass completes the writing
    of the 20 bits
}
```

The pre-populated tiles i.e., C, M, Y, R, G, or B tiles instead of white or black) can also be written to. In this example, the then-current state of the barcode can be unzipped to a bitstring of remaining bits, and then the new information can be written to this bitstring using any desirable writing operations, such as the nonce method described above.

When pre-populated tiles are written to in subsequent workflow stages, the state (e.g., {100101101100011 . . . }) after all the new bits are written is stored in the registry 12 after the initial state (e.g., {100001001000010 . . . }. Due to the algorithms used, the Hamming distance between these two strings is without a doubt 20.

In instances where the independent incremental workflow 16 is used, each workflow stage involves an intelligent hash of the previous state of the carrier object 20. In this example, a deterministic approach may be used, in which the newly written information is determined from the current state of the carrier object 20 and any additional pre-populated information that distinguishes the carrier object 20 from other carrier objects (e.g., SKU specific information and mass serialization information). In one embodiment, the carrier object 20 may be pre-populated with the SKU specific information and mass serialization information to ensure each identifying object 20''' is unique. In another embodiment, if a document has other unique information, e.g., number for routing or another barcode/stock identifier for point of sale, the other unique information can be included in the digital signature (i.e., the output of an operation on a binary string using a private key) to create the next set of bits to write.

When determining how to write the information, the computer/workstation will also select a manner in which the state change results in a predictable or authenticable change in the carrier object 20 itself. In one embodiment, this is accomplished when a binary string representation of the current state of the carrier object 20 is transformed with a security string (e.g., a private key can be encrypted with the binary string).

When determining how to write the information, the computer/workstation will also identify a writing scheme that is suitable for the then-current stage of the workflow (see again reference numeral 214 in FIG. 2). Writing schemes can be inversely weighted by the residual writing steps that may occur on each tile. For example, statistically, it is more likely to write to white tiles W than to cyan, magenta or yellow tiles C, M, or Y, and in turn it is more likely to write to cyan, magenta or yellow tiles C, M, or Y than to blue, green or red tiles B, G, or R. Using the example provided above about the 15×15 tile barcode and where 20 bits are to be added at the current stage of the workflow, if it is desirable to make writing to white tiles W twice as likely as writing to cyan, magenta or yellow tiles C, M, or Y, and to make writing to cyan, magenta or yellow tiles C, M, or Y twice as likely as writing to blue, green or red tiles B, G, or R, the following weighted writing scheme may be used:

```
double random = Rand.NextRandom( );
Location = START; // first open space is position to write, if indicated
while( nwritten < 20 )
{
for( i=0; i<ntiles; i++)
    if(currenttile.Is(white))
        random /= 2;
    else if(currenttile.Is(RGB))
        random *= 2;
    if(( random-residual < (20/165)*weight_factor ) && (allowed to
    write here))
    {
        Location.write( 1 ); // progress one step toward black (K)
        nwritten++;
    }
    else
        Location.write(0); //leave alone
    Location++; // position at next open space regardless
    // update residual here to ensure that one pass completes the writing
    of the 20 bits
}
```

It is to be understood that other weighted writing schemes may be used, depending, at least in part, upon the then-current distribution of white, cyan, magenta, yellow, blue, green, red and black tiles in the carrier object 20. In one embodiment, the weighted writing scheme may depend, at least in part, on whether the final identifying object 20''' should include branded colors, on the desired color palette, or other aesthetic considerations.

The computer/workstation performing the incremental writing at workflow stage I then writes the information to the carrier object 20 to form the carrier object 20', as shown at reference numeral 216 of FIG. 2 and as illustrated in FIG. 4C. When writing, the computer/workstation utilizes the selected color transformation process, the selected scrambling technique, the selected manner for achieving a predictable state change, and the selected writing scheme to write the information to the carrier object 20. In the example shown in FIG. 4C, some white tiles (not labeled) are written to, and some previously written to tiles are written to. For example, one of the yellow tiles Y from the carrier object 20 is written to with magenta to create a red tile (total of 1 bit added), 4 white tiles are written to with magenta to create magenta tiles M (total of 4 bits added), 6 white tiles are written to with cyan to create cyan tiles C (total of 6 bits added), 5 white tiles are written to with yellow to create yellow tiles (total of 5 bits added), 1 magenta tile M is written to with cyan to create a blue tile B (total of 1 bit added), 1 cyan tile C is written to with magenta to create a blue tile B (total of 1 bit added), and a white tile is written to with yellow and then cyan or cyan and then yellow to create a green tile G (total of 2 bits added). As such, at workflow stage I in this example, 20 additional bits are added to the carrier object 20 to form carrier object 20'.

During each writing stage in the workflow, it is to be understood that any previously written information will not be removed or changed, but rather additional information will be added and the state of the carrier object 20, 20' will change.

While the number of bits to be written is preset in one embodiment, the actual writing of the information takes place dynamically as the workflow progresses. As such, the candidate areas that are actually written to are determined in real time according to, in part, the areas available for writing, the number of bits to be written, and the algorithms used (e.g., color transformation used, weighted writing scheme used, etc.).

The document and its incrementally written to carrier object 20' can be printed and/or stored. When the carrier object 20, 20' is completely physical, the document with the carrier object 20 printed thereon as it was received (from the previous stage or from the registry 12) can be overprinted so that the newly written to areas will be filled in the printed version. When the carrier object 20, 20' is physical and electronic, the electronic version of the document and the incrementally written to carrier object 20' can be reprinted, if desired. When the incrementally written to carrier object 20' is saved, it is to be understood that it will replace any prior versions of the carrier object 20.

The document and incrementally written to carrier object 20' are then shipped (electronically or physically) to the next entity in the workflow (reference numeral 202 of FIG. 2). When the action, task, etc. set forth in the workflow stage II instructions have been performed, the carrier object 20' is incrementally written to according to the workflow stage II instructions. This is shown in FIG. 4D. Incrementally writing information to the carrier object 20' to form carrier object 20" includes the steps of segmenting the electronic version of the carrier object 20' (reference numeral 204 of FIG. 2), determining the location of remaining available candidate areas that can be written to (e.g., tiles not already filled with non-payload indicia, entropy information, etc.) (reference numeral 206 of FIG. 2), identifying or retrieving the number of bits (e.g., from the workflow instructions) to be written at the then-current stage, determining how to write the information (reference numerals 208-214 of FIG. 2), and then writing the information to the carrier object 20' (reference numeral 216 of FIG. 2). In the example shown in FIG. 4O, some white tiles (not labeled) are written to, and some previously written to tiles are written to. For example, 2 of the cyan tiles C from the carrier object 20' are written to with magenta to create 2 new blue tiles (total of 2 bits added), 2 of the magenta tiles M from the carrier object 20' are written to with cyan to create 2 blue tiles (total of 2 bits added), 2 of the cyan tiles C from the carrier object 20' are written to with yellow to create 2 green tiles (total of 2 bits added), 2 of the yellow tiles Y from the carrier object 20' are written to with cyan to create 2 green tiles (total of 2 bits added), 2 white tiles are written to with yellow to create 2 new yellow tiles (total of 2 bits added), 2 white tiles are written to with cyan to create 2 new cyan tiles C (total of 2 bits added), 2 magenta tiles M are written to with yellow to create red tiles R (total of 2 bits added), 2 yellow tiles Y are written to with magenta to create red tiles R (total of 2 bits added), 1 white the is written to with either magenta and then cyan or cyan and then magenta to create 1 blue the (total of 2 bits added), and 2 white tiles are written to with magenta to create 2 new magenta tiles (total of 2 bits added). As such, at workflow stage H in this example, 20 additional bits are added to the carrier object 20' to form carrier object 20".

The document and its incrementally written to carrier object 20" can be printed and/or stored. It is to be understood that the steps involved in incrementally writing at this stage are performed via the computer/workstation at workflow stage II.

In the embodiment shown in FIGS. 4A through 4E, the document and incrementally written to carrier object 20" are then shipped (electronically or physically) to the next entity in the workflow (reference numeral 202 of FIG. 2). When the action, task, etc. set forth in the workflow stage III instructions have been performed, the carrier object 20" is incrementally written to according to the workflow stage III instructions. This is shown in FIG. 4E. Incrementally writing information to the carrier object 20" to form carrier object 20''' may be accomplished in a manner similar to that described for writing to earlier versions of the carrier object 20, 20'. Briefly, incremental writing at this stage in the workflow includes the steps of segmenting the electronic version of the carrier object 20" (reference numeral 204 of FIG. 2), determining the location of remaining available candidate areas that can be written to (e.g., tiles not already filled with non-payload indicia, entropy information, previously written information etc.) (reference numeral 206 of FIG. 2), identifying or retrieving the number of bits (e.g., from the workflow instructions) to be written at the then-current stage, determining how to write the information (reference numerals 208-214 of FIG. 2), and then writing the information to the carrier object 20" (reference numeral 216 of FIG. 2). In the example shown in FIG. 4E, some white tiles (not labeled) are written to, and some previously written to tiles are written to. For example, 5 white tiles are written to with yellow to create 5 new yellow tiles (total of 5 bits added), 5 white tiles are written to with magenta to create 5 new magenta tiles C (total of 5 bits added), 5 white tiles are written to with cyan to create 5 new cyan tiles C (total of 5 bits added), 1 white the is written to with yellow and then cyan or cyan and then yellow to create a new green tile G (total of 2 bits added), 1 cyan tile C is written to with magenta to create a new blue tile B (total of 1 bit added), 1 blue tile B is written to with yellow to create a new black the K (total of 1 bit added), and 1 magenta tile is written to with yellow to create a new red the R (total of 1 bit added). As such, at workflow stage H in this example, 20 additional bits are added to the carrier object 20" to form carrier object 20'''.

The document and its incrementally-overwritten carrier object 20''' can be printed and/or stored. It is to be understood that the steps involved in incrementally writing at this stage are performed via the computer/workstation at workflow stage III.

Since the workflow in the example in FIGS. 4A through 4E include three workflow stages, the carrier object 20''' shown in FIG. 4E is the identifying object 20''' or security mark that is a secure verification that the workflow has proceeded correctly. As illustrated in FIGS. 4A through 4E, the final identifying object 20''' has less available modules/candidate areas than the original carrier object 20 due to the incremental writing throughout the workflow, but has the same shape and size as the original carrier object 20. It is noted that in this example, 80 of the total 192 color transformations that are possible have taken place. This also illustrates that a variety of other color transformations could have been utilized to encode the same information. Since there are numerous ways of writing information at the various stages, other carrier objects 20, 20', 20", 20''' will have available candidate areas at different locations, which aids in preventing casual counterfeiting since the odds of having two carrier objects 20, 20', 20", 20''' with the same available candidate areas at any stage of the workflow is very small.

It is to be understood that the previous states of the carrier object 20, 20', 20" are still provable because there are no new available candidate areas in the later state(s) of the carrier object 20, 20', 20", 20'''. In embodiments where the computers/workstations at each stage in the workflow have access to all the rules governing writing at the previous stages, these computers/workstations can automatically check all previous states of the carrier object for validity when checking the then-current state.

Referring now to FIG. 5, another embodiment of the identifying object 20" is depicted. In this embodiment, there are 8 non-payload indicia NPI in the upper and lower portions of the diamond-shaped carrier object and there are 56 color tiles at various stages of progression.

In any of the embodiments disclosed herein, if multiple identifying objects are part of the same shipment, it may be desirable to have the same pre-filled set of data bits.

Embodiments of the 3D barcodes (or color identifying objects or security marks) 20''' disclosed herein retain the set real estate on a document even through information is incrementally written thereto throughout a workflow. The state of the identifying object 20''' and the then-current stage of the workflow may be gleaned directly from the color of the tiles and the percentage of the elements that are filled in or saturated, without knowing how to interpret the data embedded therein.

While several embodiments have been described in detail, it will be apparent to those skilled in the art that the disclosed embodiments may be modified. Therefore, the foregoing description is to be considered non-limiting.

What is claimed is:

1. A system for generating an incrementally completed 3D security mark, comprising a computer-readable medium encoded with a computer program having:
   computer readable code for selecting a color transformation process at each stage in a workflow associated with a 3D security mark, the workflow including multiple stages;
   computer readable code for selecting a scrambling technique for data to be incrementally placed into a carrier object of a 3D security mark at each stage in the workflow;
   computer readable code for selecting a manner in which a state change of the carrier object at each stage in the workflow results in a predictable change in the 3D security mark;
   computer readable code for weighting writing schemes at each stage in the workflow; and
   wherein the system further includes memory and a processor operatively coupled to the memory and to the computer-readable medium.

2. The system as defined in claim 1, further comprising computer readable code for setting entropy in the carrier object at a start of the workflow.

3. The system as defined in claim 1, further comprising computer readable code for updating writing schemes at each stage in the workflow to reflect a then-current distribution of color modules in the carrier object.

4. The system as defined in claim 1, further comprising computer readable code for setting a Hamming distance between states of the carrier object.

5. The system as defined in claim 1, further comprising computer readable code for setting non-payload indicia (NPI) in the carrier object.

6. The system as defined in claim 1 wherein the computer readable code for selecting the color transformation process at each stage in the workflow includes:
   computer readable code for identifying a then-current color of an available area in the carrier object; and
   computer readable code for selecting a color pathway for the available area based upon the then-current color and a number of bits to be encoded at a particular stage in the workflow.

7. The system as defined in claim 1, further comprising computer readable code for determining a number of bits to be input to the carrier object of the 3D security mark at each step in the workflow to meet statistical targets.

8. The system as defined in claim 7, further comprising computer readable code for incrementally writing the number of bits at a particular stage in the workflow, the computer readable code for incrementally writing including:
   computer readable code for segmenting the carrier object from an electronic image including the carrier object;
   computer readable code for interpreting the carrier object to determine a location of remaining available color modules of the carrier object that can be written to; and
   computer readable code for writing the number of bits to some of the remaining available color modules using the selected color transformation process, the selected scrambling technique, the selected manner, and a selected one of the writing schemes.

9. A 3D security mark, comprising:
   a carrier object including a set of color modules, the set having a size and shape that are unchanged as information is written to individual modules of the set; and
   available individual modules in the set of color modules for receiving information, at least some of the available individual modules having had the information written thereto during different stages of a workflow such that the carrier object is different at the different stages of the workflow, thereby forming the 3D security mark (20''') having a smaller percentage of available individual modules than is included in the set of color modules prior to the workflow.

10. The 3D security mark as defined in claim 9 wherein the 3D security mark is chosen from an electronic security mark, a mixed electronic and physical security mark, and a physical security mark.

11. The 3D security mark as defined in claim 9 wherein each of the available individual modules can be written to three times in its lifecycle.

12. The 3D security mark as defined in claim 11 wherein each of the available individual modules includes:
    a first state equivalent to a white color module;
    a second state chosen from a cyan color module, a magenta color module, and a yellow color module;
    a third state chosen from a blue color module, a green color module, and a red color module, and wherein the third state depends upon the second state; and
    a fourth state equivalent to a black color module.

13. The 3D security mark as defined in claim 9, further comprising at least one of:
    information written to some available individual modules in the set of color modules prior to initiation of the workflow; or
    non-payload indicia (NPI) color modules set prior to initiation of the workflow.

14. A method for generating a 3D security mark (20'''), comprising:
    pre-assigning or dynamically determining a number of bits to be encoded in a carrier object of the 3D security mark at each stage in a workflow including multiple stages, the carrier object including a set of color modules;
    at each stage in the workflow, receiving the set of color modules;
    at each stage in the workflow, imaging the set of color modules;
    at each stage in the workflow, determining a location of available individual modules in the set of color modules;
    at each stage in the workflow, determining how to write the bits to the available individual modules by:
      selecting a color transformation process;
      selecting a scrambling technique; and
      selecting a writing scheme based upon a then-current distribution of available individual modules; and at each stage in the workflow, writing the bits to at least some of the available individual modules.

15. The method as defined in claim 14, further comprising setting entropy areas in the set of color modules.

16. The method as defined in claim 14 wherein prior to pre-assigning or dynamically determining the number of bits to be encoded in the carrier object at each stage in the workflow, the method further includes determining the number of bits to be encoded by at least one of:
   probability; and
   determining a modified Hamming distance between states of the carrier object.

* * * * *